(12) United States Patent
Wang

(10) Patent No.: US 11,447,335 B2
(45) Date of Patent: Sep. 20, 2022

(54) SYSTEM FOR REPLENISHING SELF-SERVICE PICK-UP CABINET, SELF-SERVICE PICK-UP CABINET SYSTEM, APPARATUS AND METHOD

(71) Applicant: Beijing Jingdong Qianshi Technology Co., Ltd., Beijing (CN)

(72) Inventor: Xianwang Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 615 days.

(21) Appl. No.: 16/479,883

(22) PCT Filed: Jan. 12, 2018

(86) PCT No.: PCT/CN2018/072443
§ 371 (c)(1),
(2) Date: Jul. 22, 2019

(87) PCT Pub. No.: WO2018/141200
PCT Pub. Date: Aug. 9, 2018

(65) Prior Publication Data
US 2021/0354914 A1 Nov. 18, 2021

(30) Foreign Application Priority Data
Feb. 3, 2017 (CN) .......................... 201710063919.9

(51) Int. Cl.
*B65G 1/04* (2006.01)
*G07F 17/12* (2006.01)
(Continued)

(52) U.S. Cl.
CPC ..... *B65G 1/0421* (2013.01); *B60W 60/00256* (2020.02); *B65G 43/00* (2013.01);
(Continued)

(58) Field of Classification Search
CPC combination set(s) only.
See application file for complete search history.

(56) References Cited

U.S. PATENT DOCUMENTS

| 6,494,150 | B1 * | 12/2002 | Phoenix | A47B 51/00 |
| | | | | 108/147 |
| 2015/0332206 | A1 * | 11/2015 | Trew | G06Q 10/0836 |
| | | | | 705/330 |
| 2021/0354914 | A1 * | 11/2021 | Wang | B65G 43/00 |

FOREIGN PATENT DOCUMENTS

| CN | 102689762 | 9/2012 |
| CN | 203865363 | 10/2014 |
| (Continued) | | |

OTHER PUBLICATIONS

International Search Report, issued in the corresponding PCT application No. PCT/CN2018/072443, dated Apr. 17, 2018, 7 pages.

*Primary Examiner* — Kyle O Logan
(74) *Attorney, Agent, or Firm* — Hamre, Schumann, Mueller & Larson, P.C.

(57) ABSTRACT

A system for replenishing a self-service pick-up cabinet, a self-service pick-up cabinet system, an apparatus, and a method are provided. The system for replenishing self-service pick-up cabinet controls, by means of a control system, an goods transport device to acquire replenishing goods at an inlet of a self-service pick-up cabinet, and transports the replenishing goods to a goods locker, which is designated by the control system, of the self-service pick-up cabinet. The self-service pick-up cabinet system comprises the system for replenishing a self-service pick-up cabinet, the self-service pick-up cabinet and an unmanned delivery vehicle. The unmanned delivery vehicle transports and unload the replenishing goods to the inlet of the self-service (Continued)

pick-up cabinet. The replenishing efficiency of the self-service pick-up cabinet is improved and the labor cost is reduced.

15 Claims, 7 Drawing Sheets

(51) Int. Cl.
*B60W 60/00* (2020.01)
*B65G 43/00* (2006.01)
*G05B 15/02* (2006.01)
*B65G 67/24* (2006.01)
*G06Q 10/06* (2012.01)
*G06Q 10/08* (2012.01)

(52) U.S. Cl.
CPC ............. *G05B 15/02* (2013.01); *G07F 17/12* (2013.01); *B65G 67/24* (2013.01); *G06Q 10/06315* (2013.01); *G06Q 10/0836* (2013.01)

(56) References Cited

FOREIGN PATENT DOCUMENTS

| CN | 105852451 | 8/2016 |
| CN | 105957267 | 9/2016 |
| CN | 106333595 | 1/2017 |

\* cited by examiner

SYSTEM FOR REPLENISHING SELF-SERVICE PICK-UP CABINET, SELF-SERVICE PICK-UP CABINET SYSTEM, APPARATUS AND METHOD

CROSS-REFERENCE TO RELATED APPLICATION

This application is a Section 371 National Stage Application of International Application No. PCT/CN2018/072443, filed on Jan. 12 2018. This application claims the benefit of Chinese Patent Application No. 201710063919.9 filed on Feb. 3, 2017 in the China National Intellectual Property Administration, the whole disclosure of which is incorporated herein by reference.

TECHNICAL FIELD

The present disclosure relates to the field of artificial intelligence technology, and in particular, to a system for replenishing a self-service pick-up cabinet, a self-service pick-up cabinet system, an apparatus and a method.

BACKGROUND

The self-service pick-up cabinet may achieve functions for express goods, such as intelligent centralized access, designated location access, 24-hour access, remote monitoring, information release or the like, which may improve the delivery efficiency of express delivery and the goods access experience of a user. However, in the prior art, the self-service pick-up cabinet generally adopts a manner of manual replenishment, that is, the delivery staff transports goods to the vicinity of the self-service pick-up cabinet, and then delivers the goods one by one to respective goods lockers of the self-service pick-up cabinet, and then the user is notified to pick up the goods by a control system of the self-service pick-up cabinet or the delivery staff. The current manner of manual replenishment is relatively less efficient and cost a lot of labor.

SUMMARY

Embodiments of the present disclosure provide for replenishing a self-service pick-up cabinet, a self-service pick-up cabinet system, a corresponding apparatus for replenishing goods, a corresponding control system, and a corresponding method of replenishing goods.

According to a first aspect of the embodiments of the present disclosure, a system for replenishing a self-service pick-up cabinet is provided, the self-service pick-up cabinet comprising a plurality of goods lockers, the system for replenishing the self-service pick-up cabinets comprising an goods transport device and a control system, wherein: the control system controls an action of the goods transport device; the goods transport device is located on a rear side of the self-service pick-up cabinet, and comprises: a moving unit and a goods carrying unit, wherein the moving unit is capable of transporting the goods carrying unit to a rear side opening of any one of the plurality of goods lockers of the self-service pick-up cabinet, the moving unit transports the goods carrying unit to an inlet of the self-service pick-up cabinet to acquire replenishing goods at the inlet of the self-service pick-up cabinet, and transport the goods carrying unit carrying the replenishing goods to the rear side opening of one, designated by the control system, of the plurality of goods lockers of the self-service pick-up cabinet, under the control of the control system; the goods carrying unit places the carried replenishing goods into the one of the plurality of goods lockers under the control of the control system.

Optionally, the goods transport device is a cartesian robot, and the moving unit comprises a first shaft and a second shaft; the first shaft and the second shaft intersect perpendicularly; and a plane formed by the first shaft and the second shaft is parallel to a plane in which the rear side opening of any one of the plurality of goods lockers of the self-service pick-up cabinet is located; the first shaft is fixed in a first direction, the first direction being a direction of a horizontal plane where the self-service pick-up cabinet is located or a direction perpendicular to the horizontal plane where the self-service pick-up cabinet is located; the second shaft is slidable along the first shaft; the goods carrying unit is located on the second shaft and moves with the sliding of the second shaft, while being slidable along the second shaft.

Optionally, the goods carrying unit is a horizontal tray comprising a pallet and a push plate; the pallet is slidable in a third direction perpendicular to the plane formed by the first shaft and the second shaft to extend into the one of the plurality of goods lockers of the self-service pick-up cabinet when the replenishing goods are transported into the one of the plurality of goods lockers of the self-service pick-up cabinet; the push plate is mounted on the pallet and located at one end of the pallet; the push plate is movable together with the horizontal sliding of the pallet; and the push plate is slidable from the one end of the pallet to the other end to push the carried replenishing goods on the pallet into the one of the plurality of goods lockers of the self-service pick-up cabinet.

Optionally, the first shaft includes a first slide table slidable along the first shaft, an end of the second shaft is fixed to the first slide table so that the second shaft is slidable along the first shaft; the second shaft includes a second slide table slidable along the second shaft, and the goods carrying unit is fixed to the second slide table so that the goods carrying unit is slidable along the second shaft.

Optionally, The system for replenishing the self-service pick-up cabinet further comprising: a packaging cabinet configured to package the goods transport device on the rear side of the self-service pick-up cabinet.

Optionally, the inlet of the self-service pick-up cabinet is disposed on at least a side of the packaging cabinet; and an outer side of the packaging cabinet is provided with a feeding passage for the replenishing goods to enter the inlet of the self-service pick-up cabinet;

the goods carrying unit acquires the replenishing goods through the feeding passage at the inlet of the self-service pick-up cabinet.

According to a second aspect of the embodiments of the present disclosure, a method of replenishing goods by using the system is provided, comprising: controlling the moving unit to transport the goods carrying unit to the inlet of the self-service pick-up cabinet; controlling the moving unit to transport the goods carrying unit to the rear side opening of the designated one of the plurality of goods lockers of the self-service pick-up cabinet after acquiring the replenishing goods; and controlling the goods carrying unit to place the carried replenishing goods into the one of the plurality of goods lockers.

According to a third aspect of the embodiments of the present disclosure, the control system in the system for replenishing the self-service pick-up cabinet, comprising: a first control module configured to control the moving unit to transport the goods carrying unit to the inlet of the self-service pick-up cabinet; a second control module configured to control the moving unit to transport the goods carrying unit to the rear side opening of the designated one of the plurality of goods lockers of the self-service pick-up cabinet after acquiring the replenishing goods; and a third control module configured to control the goods carrying unit to place the carried replenishing goods into the one of the plurality of goods lockers of the self-service pick-up cabinet.

According to a fourth aspect of the embodiments of the present disclosure, a control system for replenishing a self-service pick-up cabinet is provided, comprising: one or more memories in which storing executable instructions are stored; and one or more processors configured to execute the executable instructions to implement the above-mentioned method of replenishing goods by using the system.

According to a fifth aspect of the embodiments of the present disclosure, a machine readable storage medium is provided, wherein executable instructions are stored in the machine readable storage medium, and the above-mentioned method of replenishing goods by using the system is implemented when executable instructions are executed by a processor.

According to a sixth aspect of the embodiments of the present disclosure, a self-service pick-up cabinet system is provided, comprising: a self-service pick-up cabinet; an unmanned delivery vehicle; and the system for replenishing the self-service pick-up cabinet provided by the first aspect; wherein the self-service pick-up cabinet comprises the plurality of goods lockers; the unmanned delivery vehicle is configured to transport and unload the replenishing goods to the inlet of the self-service pick-up cabinet.

Optionally, the unmanned delivery vehicle comprises a positioning device and an unloading device, the positioning device is configured to position an outlet of the unmanned delivery vehicle above the feeding passage of the self-service pick-up cabinet; the unloading device is configured to unload the replenishing goods into the feeding passage of the self-service pick-up cabinet via the outlet of the unmanned delivery vehicle.

According to a seven aspect of the embodiments of the present disclosure, a method of replenishing goods by using the above-mentioned self-service pick-up cabinet system, comprising: controlling the moving unit to transport the goods carrying unit to the inlet of the self-service pick-up cabinet; sending an instruction, which is used for unloading the replenishing goods, to the unmanned delivery vehicle after the goods carrying unit arrives at the inlet of the self-service pick-up cabinet; controlling the moving unit to transport the goods carrying unit to the rear side opening of the designated one of the plurality of goods lockers of the self-service pick-up cabinet after the goods carrying unit acquires the replenishing goods; and controlling the goods carrying unit to place the carried replenishing goods into the one of the plurality of goods lockers of the self-service pick-up cabinet.

According to an eighth aspect of the embodiments of the present disclosure, an apparatus for replenishing goods by using the above-mentioned self-service pick-up cabinet system, comprising: a fourth control module configured to control the moving unit to transport the goods carrying unit to the inlet of the self-service pick-up cabinet; a fifth control module configured to send an instruction, which is used for unloading the replenishing goods, to the unmanned delivery vehicle after the goods carrying unit arrives at the inlet of the self-service pick-up cabinet; and a sixth control module configured to control the moving unit to transport the goods carrying unit to the rear side opening of the designated one of the plurality of goods lockers of the self-service pick-up cabinet after the goods carrying unit acquires the replenishing goods; and a seventh control module configured to control the goods carrying unit to place the carried replenishing goods into the one of the plurality of goods lockers.

According to a ninth aspect of the embodiments of the present disclosure, a control system for replenishing a self-service pick-up cabinet is provided, comprising: one or more memories in which storing executable instructions are stored; and one or more processors configured to execute the executable instructions to implement the above-mentioned method of replenishing goods by using the self-service pick-up cabinet system.

According to a ninth aspect of the embodiments of the present disclosure, a machine readable storage medium is provided, wherein executable instructions are stored in the machine readable storage medium, and the above-mentioned method of replenishing goods by using the self-service pick-up cabinet system is implemented when executable instructions are executed by a processor.

In the system for replenishing the self-service pick-up cabinet provided by the above-mentioned technical schemes, the control system controls the goods transport device to automatically replenish the self-service pick-up cabinet, thereby improving the replenishing efficiency of the self-service pick-up cabinet and reducing the labor cost.

In the self-service pick-up cabinet system provided by the above-mentioned technical schemes, the unmanned delivery vehicle transports and unloads the replenishing goods to the inlet of the self-service pick-up cabinet, and then the self-service pick-up cabinet is automatically replenished by using the system for replenishing the self-service pick-up cabinet. On one hand, it provides a feasible solution for the application of unmanned delivery vehicles, while the automatic delivery of unmanned delivery vehicles improves the delivery efficiency; on the other hand, the self-service pick-up cabinet is automatically replenished by using the system for replenishing the self-service pick-up cabinet, thereby improving the replenishing efficiency of the self-service pick-up cabinet and reducing the manpower input. In this way, the delivery and replenishing process of the self-service pick-up cabinet system is optimized, which greatly reduces the labor cost.

It should be understood that the above general description and the following detailed description are merely exemplary and explanatory and are not intend to limit the present disclosure.

DETAILED DESCRIPTION OF THE EMBODIMENTS

Figure 1:
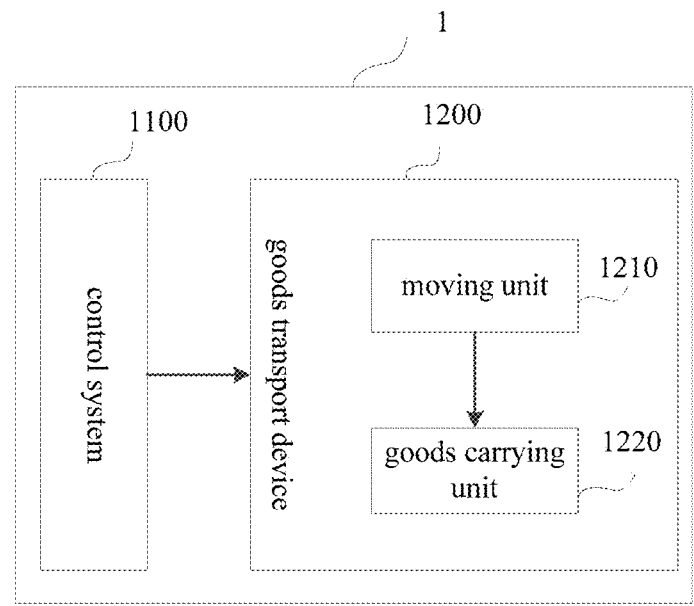
FIG. 1 is a block diagram showing a system for replenishing a self-service pick-up cabinet according to an embodiment of the present disclosure.

In order to make the objects, technical schemes and advantages of the present disclosure more clear, The present disclosure will be further described in detail below in conjunction with specific embodiments and with reference to the accompanying drawings.

In the present disclosure, the terms "comprise" and "include" and their derivatives are meant to be inclusive and not limiting; the term "or" is inclusive, and means and/or.

In the present specification, the following various embodiments for describing the principles of the present disclosure are merely illustrative, and should not be construed as limiting the scope of the invention in any way. The following description with reference to the drawings is intended to assist in a comprehensive understanding of the exemplary embodiments of the present invention as defined by the claims and their equivalents. The following description includes numerous specific details to assist in the understanding, but these details should be considered as merely exemplary. Accordingly, it will be appreciated by those skilled in the art that various changes and modifications may be made to the embodiments described herein without departing from the scope and spirit of the disclosure. In addition, descriptions of well-known functions and constructions are omitted for clarity and conciseness. In addition, throughout the drawings, the same reference numerals are used for similar functions and operations.

FIG. 1 schematically illustrates a block diagram of a system for replenishing a self-service pick-up cabinet in accordance with an embodiment of the present disclosure. A system 1 for replenishing a self-service pick-up cabinet according to an embodiment of the present disclosure includes a control system 1100 and a goods transport device 1200. The control system 1100 is used to control an action of the goods transport device 1200. The goods transport device 1200 is located on a rear side of the self-service pick-up cabinet, and includes a moving unit 1210 and a goods carrying unit 1220 that may transport the goods carrying unit 1220 to a rear side opening of any goods locker of the self-service pick-up cabinet. The moving unit 1210, under the control of the control system 1100, transports the goods carrying unit 1220 to the inlet of the self-service pick-up cabinet to acquire replenishing goods at the inlet of the self-service pick-up cabinet, and transports the goods carrying unit 1220 carrying the replenishing goods to the rear side opening of the goods locker, designated by the control system 1100, of the self-service pick-up cabinet. The goods carrying unit 1220 places the carried replenishing goods in the goods locker under the control of the control system 1100.

According to an embodiment of the present disclosure, by the control system 1100 controls the action of the goods transport device 1200, so that the moving unit 1210 may transport the goods carrying unit 1220 to any goods locker of the self-service pick-up cabinet, and the goods carrying unit 1220 may send replenishing goods into a corresponding goods locker. Thereby the goods carrying unit 1220 is accurately positioned at the inlet of the self-service pick-up cabinet and the goods locker, designated by the control system 1100, of the self-service pick-up cabinet, and moved between the two positions. In this way, the system according to the embodiment of the present disclosure may accurately acquire the replenishing goods at the inlet of the self-service pick-up cabinet, and accurately move the replenishing goods to the corresponding goods locker of the self-service pick-up cabinet, thereby realizing automatic replenishment of the self-service pick-up cabinet.

Figure 2:
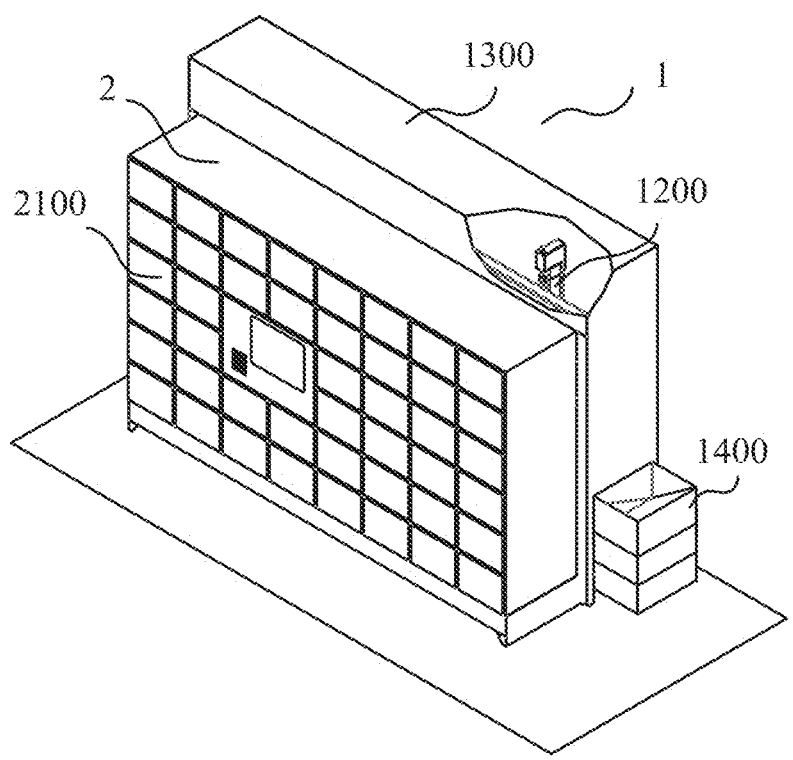
FIG. 2 is a schematic assembly view of a system for replenishing a self-service pick-up cabinet and a self-service pick-up cabinet according to an embodiment of the present disclosure.
Figure 3:
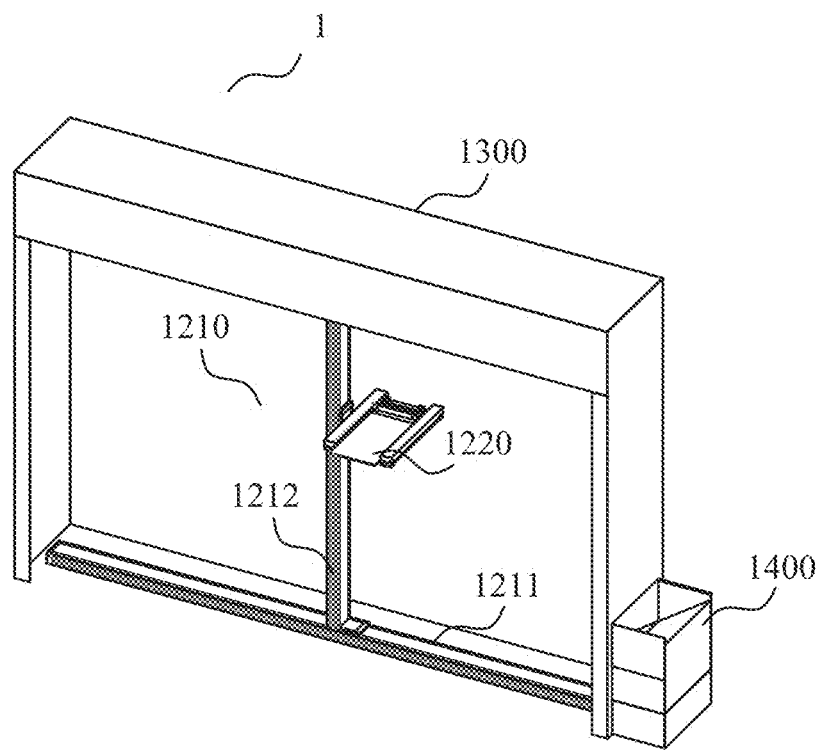
FIG. 3 is a schematic structural view of a system for replenishing a self-service pick-up cabinet according to an embodiment of the present disclosure.

FIG. 2 schematically shows an assembly view of a system for replenishing a self-service pick-up cabinet and a self-service pick-up cabinet according to an embodiment of the present disclosure, and FIG. 3 schematically shows a structural view of a system for replenishing a self-service pick-up cabinet according to an embodiment of the present disclosure. The control system 1100 is not shown in FIGS. 2 and 3.

In an embodiment, the goods transport device 1200 of the system 1 for replenishing the self-service pick-up cabinet is located on the rear side of the self-service pick-up cabinet 2, the self-service pick-up cabinet 2 includes a plurality of goods lockers 2100.

In an embodiment, the system 1 for replenishing the self-service pick-up cabinet further includes a packaging cabinet 1300 for packaging the goods transport device 1200 on the rear side of the self-service pick-up cabinet 2. On one hand, the packaging cabinet 1300 functions to protect the goods transport device 1200; on the other hand, the self-service pick-up cabinet 2 and the goods transport device 1200 are integrally sealed, thereby ensuring the safety of the replenishing goods after entering the self-service pick-up cabinet.

In an embodiment, the inlet of the self-service pick-up cabinet of the system 1 for replenishing the self-service pick-up cabinet is disposed on at least one side of the packaging cabinet 1300. The figure is merely exemplary, and it may be disposed on any side of the packaging cabinet as long as the goods carrying unit 1220 in the goods transport device 1200 may arrive. An outer side of the packaging cabinet 1300 is provided with a feeding passage 1400 for the replenishing goods to enter the inlet of the self-service pick-up cabinet. The goods carrying unit 1220 acquires the replenishing goods through the feeding passage 1400 at the inlet of the cabinet. The packaging cabinet 1300 is sealed except for the inlet of the self-service pick-up cabinet. After the replenishing goods 1400 enters the self-service pick-up cabinet 2 and is acquired by the goods carrying unit 1220, it is moved by the moving unit 1210 to the rear side opening of the goods locker 2100 designated by the control system 1100, and then the replenishing goods are stored into the goods locker 2100, designated by the control system 1100, of the self-service pick-up cabinet by the goods carrying unit 1220.

Figure 4:
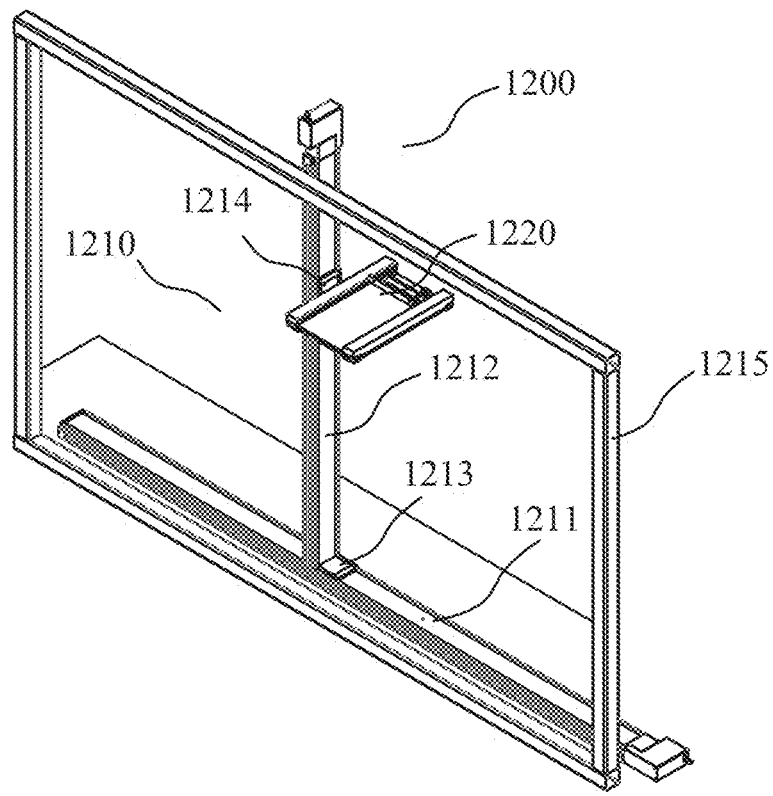
FIG. 4 is a schematic structural view of a goods transport device according to an embodiment of the present disclosure.

FIG. 4 schematically shows a structural view of a goods transport device according to an embodiment of the present disclosure. According to FIG. 4, in an embodiment, the goods transport device 1200 of the system 1 for replenishing the self-service pick-up cabinet is a cartesian robot. The moving unit 1210 includes a first shaft 1211 and a second shaft 1212. The first shaft 1211 and the second shaft 1212 intersect perpendicularly, and a plane formed by the first shaft 1211 and the second shaft 1212 is parallel to a plane in which the rear side opening of any one of the plurality of goods lockers 2100 of the self-service pick-up cabinet is located. In this case, on one hand, it is ensured that the system 1 for replenishing the self-service pick-up cabinet may be structurally tightly coupled with the self-service pick-up cabinet 2; on the other hand, when the moving unit 1210 moves the goods carrying unit 1220, as long as the a position of the carrying unit 1220 in the plane in which the moving unit 1210 is located is accurately calculated, the goods carrying unit 1220 may be accurately projected onto a plane on which the rear side opening of any one of the goods lockers is located, thereby enabling the moving unit 1210 to accurately move the goods carrying unit 1220 to an position corresponding to the rear side opening of any one of the goods lockers.

In an embodiment, the first shaft 1211 of the moving unit 1210 is fixed in a first direction, the first direction being a direction of a horizontal plane where the self-service pick-up cabinet 2 is located or a direction perpendicular to the horizontal plane where the self-service pick-up cabinet 2 is located. The second shaft 1212 is slidable along the first shaft 1211. The goods carrying unit 1220 is located on the second shaft 1212 and moves with the sliding of the second shaft 1212 while being slidable along the second shaft 1212.

For example, according to an embodiment of the present disclosure, the first shaft 1211 of the moving unit 1210 is fixed in a horizontal direction, and the second shaft 1212 is vertically slidably mounted on the first shaft 1211, and is slidable leftwards or rightwards in the horizontal direction in which the first shaft 1211 extends, thereby the goods carrying unit 1220 is simultaneously moved in the horizontal direction. Meanwhile, the goods carrying unit 1220 is slidably mounted on the second shaft 1212 and is slidable in a vertical direction in which the second shaft 1212 extends, so that the goods carrying unit 1220 may be accurately moved to an arbitrary point in the plane formed by the first shaft 1211 and the second shaft 1212, thereby achieving accurate positioning of the goods carrying unit 1220 in the plane formed by the first shaft 1211 and the second shaft 1212. In practice, the first shaft 1211 and the second shaft 1212 may be interchanged, that is, the first shaft 1211 is fixed in the vertical direction and the second shaft 1212 extends in the horizontal direction.

In addition, in practical applications, the arrangement and position of the respective axes of the moving unit 1210 may also take on more different forms. For example, two vertical shafts are separated and arranged on both sides, respectively (equivalent to that two first shafts 1211 in an embodiment 1211 is vertically fixed on both sides, respectively), and both ends of a middle horizontal shaft is slidably mounted on the two vertical shafts, respectively (corresponding to the second shaft 1212 in an embodiment).

In an embodiment, the first shaft 1211 includes a first slide table 1213 slidable along the first shaft 1211, and an end of the second shaft 1212 is fixed to the first slide table 1213 and slidable along the first shaft 1211. The second shaft 1212 includes a second slide table 1214 slidable along the second shaft 1212, and the goods carrying unit 1220 is fixed to the second slide table 1214 to be slidable along the second shaft 1212. The first slide table 1213 is used to vertically mount the second shaft 1212 on one hand and to enable the second shaft 1212 to slide along the first shaft 1211 on the other hand. Similarly, the second slide table 1214 is used to horizontally mount the goods carrying unit 1220 on one hand and to enable the carrying unit 1220 slide along the second shaft 1212 on the other hand. Optionally, the first slide table 1213 and/or the second slide table 1214 may also be replaced with a device having the similar function such as a roller, a conveyor belt or the like.

In addition, as shown in FIG. 4, in order to enhance the support for the goods transport device 1200 in practice, a support frame 1215 may be mounted on the goods transport device 1200 as required. The structure of the support frame is determined as required, for example, the support frame 1215 in FIG. 4 is a rectangular frame having four sides.

According to an embodiment of the present disclosure, the cartesian robot constituting the goods transport device 1200 is an automatic device capable of realizing automatic control, repeatable programming, and motion freedom including three-dimensional orthogonal translation, and capable of performing various operations such as transporting goods and operating tools or the like.

Figure 5:
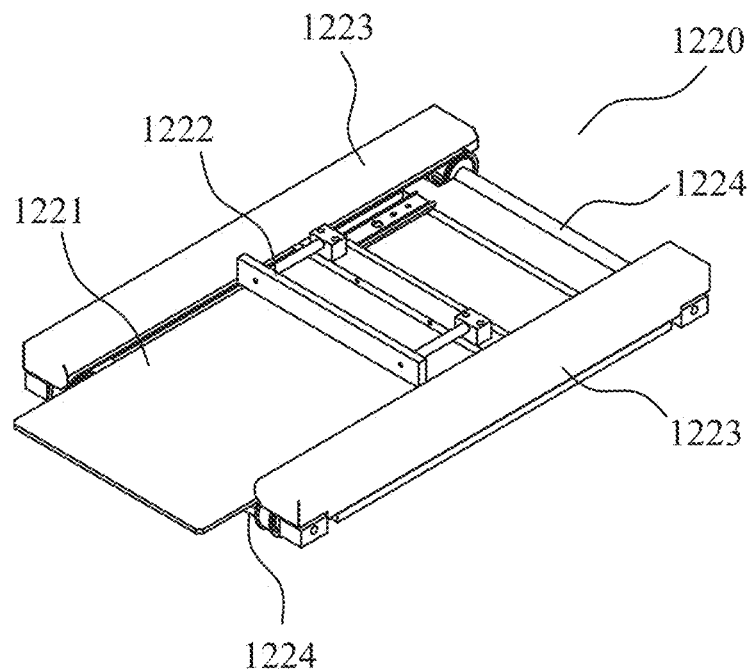
FIG. 5 is a schematic structural view of a goods carrying unit according to an embodiment of the present disclosure.

FIG. 5 schematically shows a structural view of a goods carrying unit according to an embodiment of the present disclosure.

Referring to FIGS. 4 and 5, in an embodiment, the goods carrying unit 1220 is a horizontal tray including a pallet 1221 and a push plate 1222. The pallet 1221 is slidable in a third direction perpendicular to the plane formed by the first shaft 1211 and the second shaft 1212 to extend into the goods locker 2100 of the self-service pick-up cabinet when the replenishing goods are transported from the rear side of the self-service pick-up cabinet to the goods locker 2100 of the self-service pick-up cabinet. The push plate 1222 is mounted on the pallet 1221 at one end of the pallet 1221. The push plate 1222 is movable together with the horizontal sliding of the pallet 1221, and the push plate 1222 is slidable from the one end of the pallet 1221 to the other end to push the carried replenishing goods on the pallet 1221 to the goods locker 2100 of the self-service pick-up cabinet. The goods carrying unit 1220 be constituted of the horizontal tray may ensure that the replenishing goods are horizontally acquire and moved, and the situation that the replenishing goods falls from the goods carrying unit 1220 is avoided. Specifically, the upper surface of the pallet 1221 in the goods carrying unit 1220 may be in contact with the bottom of the goods to provide horizontal support for the goods. The push plate 1222 is located on the side of the replenishing goods away from the self-service pick-up cabinet 2, and may push the replenishing goods from the pallet 1221 when it is necessary to separate the replenishing goods from the pallet 1221.

After the goods carrying unit 1220 carrying the replenishing goods are moved to the rear side opening of the goods locker, designated by the control system 1100, of the self-service pick-up cabinet, the pallet 1221 may slide in the above-mentioned third direction, thereby enabling the replenishing goods to enter the goods locker 2100 of the self-contained cabinet. During this process, the push plate 1222 and the pallet 1221 move together, that is, the relative position of the push plate 1222 with respect to both the pallet 1221 and the carried replenishing goods on the pallet 1221 is unchanged. Then, after the pallet 1221 carries the replenishing goods into the goods locker and stops moving, the push plate 1222 slides relative to the pallet 1221, and pushes the replenishing goods from one end of the pallet 1221 to the other end, so that the replenishing goods are separated from the pallet 1221, is placed in the goods locker. Next, the pallet 1221 may be temporarily held still, and the push plate 1222 is firstly returned to the one end of the pallet 1221. Then, the pallet 1221 and the push plate 1222 are returned together in the third direction to the plane where the cartesian robot is located, they leave the goods locker 2100 of the self-service pick-up cabinet to complete the entire unloading process of the goods from the goods carrying unit 1220. After the unloading of the replenishing goods, the moving unit 1210 moves the goods carrying unit 1220 to the inlet of the self-service pick-up cabinet again, and waits for replenishing goods to enter the self-service pick-up cabinet. This is repeated until all the replenishing goods are replenished into the empty goods lockers of the self-service pick-up cabinet 1.

According to an embodiment of the present disclosure, the sliding of the pallet 1221 and the push plate 1222 of the goods carrying unit 1220 may be achieved by various mechanical manners.

For example, the goods carrying unit 1220 further includes two frames 1223 provided with sliding grooves, and two cylindrical rods 1224. Each frame 1223 has a bearing hole, where bearing is mounted, on the lower side of each of ends. Two cylindrical rods 1224 are respectively mounted on both ends of the two frames 1223 by bearings to connect the two frames. Meanwhile, the two cylindrical rods 1224 are rotatable around their own axes, respectively.

In one case, both side edges of the pallet 1221 are respectively inserted into the sliding grooves of the frames 1223, and the bottom of the pallet 1221 is in contact with the two cylindrical rods 1224. A bottom face of the pallet 1221 may be roughened, such as adding a concave stripe parallel to the two cylindrical rods 1224. An outer surface of a middle portion, located between the two frames, of each of cylindrical rods 1224 is provided with a protrusion which may be inserted into the concave stripe, and a pressure between the two cylindrical rods 1224 and the pallet 1221 is appropriately increased, so that when each cylindrical rod 1224 is rotated, the pallet 1221 slides in the sliding grooves of the frames 1223 due to a frictional force and a pushing action of the protrusion on each cylindrical rod 1224. As both cylindrical rods 1224 may have different directions of rotation, the pallet 1221 may slide in opposite directions within the sliding grooves of the frames 1223. The push plate 1222 is mounted on the pallet 1221, and both side edges of the push plate 1222 may be located on the pallet 1221 in the sliding groove of the frame 1223. A sliding member such as a ball is disposed between a lower portion of the push plate 1222 and an upper surface of the support plate 1221. An upper portion of the push plate 1222 maintains a gap with an edge of the sliding groove of each frame 1223, so that when the ball rolls on the pallet 1221, the push plate 1222 may move from one end of the pallet 122 to the other end; when the ball is stationary relative to the pallet 1221, the push plate 1222 will move with the movement of the pallet 1221.

In another case, a synchronous pulley controlled by a motor is winded around the each end of each cylindrical rod 1224. both sides of the synchronous pulley are located in the sliding grooves of the frames 1223 and are provided with a rail for the movement of the push plate 1222. The pallet 1221 is located in the middle of the synchronous pulley and two rails are disposed on both sides of the pallet 1221, respectively. A rear portion of the push plate 1222 is fixed to the rails of the friction pulley, and the other portion is located on the pallet 1221. A friction member is disposed between the pallet 1221 and the push plate 1222, so that the push plate 1221 may be moved together when the push plate 1222 slides. In addition, a stop device is disposed on the bottom of the pallet 1221 or on the frames 1223. When the pallet 1221 is moved to a certain position relative to the frames 1223, the position of the pallet 1221 is limited and the pallet 1221 no longer moves. In this case, when the motor drives the synchronous pulley to move, the synchronous pulley drives the push plate 1222 to move, and the pallet moves forward at the same time due to the action of the friction member. When the pallet 1221 moves to the position limited by the stop device, the pallet 1221 stops moving, and the push plate 1222 continues to move forward until reaching the other end of the pallet 1221. When the push plate 1222 moves in the opposite direction, the movement of the pallet 1221 is also driven by the friction member. When the pallet 1221 returns to the ends of the frames 1223, the pallet 1221 stops moving. At this time, the push plate 1222 continues to move with the synchronous pulley until it returns to the one end of the pallet 1221.

Figure 6:
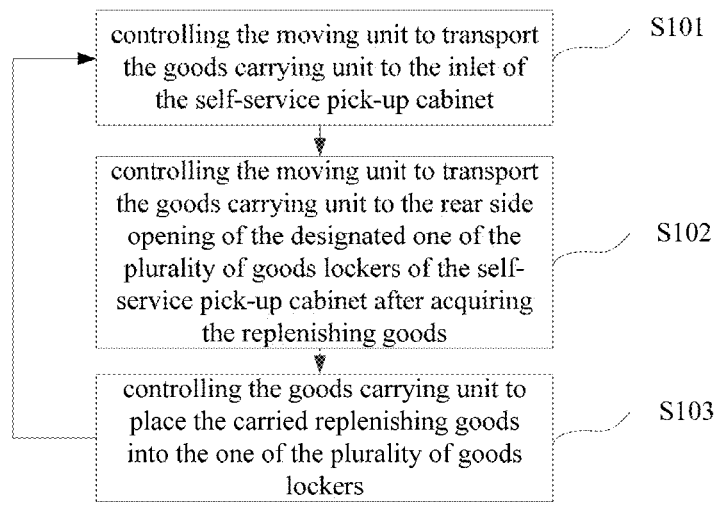
FIG. 6 is a flow chart showing a method of replenishing goods by using a system for replenishing a self-service pick-up cabinet according to an embodiment of the present disclosure.

FIG. 6 schematically illustrates a flow chart of a method of replenishing goods by using a system for replenishing a self-service pick-up cabinet according to an embodiment of the present disclosure. Specifically, the following steps are included:

In step S101, the moving unit 1210 is controlled to transport the goods carrying unit 1220 to the inlet of the self-service pick-up cabinet. According to a movement track of the replenishing goods through the inlet of the self-service pick-up cabinet, the goods carrying unit 1220 is placed at a position, where the replenishing goods may be just received, below the inlet of the self-service pick-up cabinet, so that once the replenishing goods enter the self-service pick-up cabinet 2 through the inlet of the self-service pick-up cabinet, it may be smoothly captured by the goods carrying unit 1220.

In step S102, after the replenishing goods are acquired, the moving unit 1210 is controlled to transport the goods carrying unit 1220 to the rear side opening of the designated goods locker 2100 of the self-service pick-up cabinet. After the goods carrying unit 1220 acquires the replenishing goods, it is possible to detect that the replenishing goods has been acquired by a photosensor or a gravity sensor disposed on the object carrying unit 1220 or the like, and then the control system 1100 controls the moving unit 1210 to move the goods carrying unit 1220, so that the replenishing goods arrives on the rear side opening of the designated goods locker 2100 of the self-service pick-up cabinet.

In step S103, the goods carrying unit 1220 is controlled to place the carried replenishing goods in the goods locker 2100. The control system 1100 controls the pallet 1221 of the goods carrying unit 1220 to move inside the self-service pick-up cabinet, thereby allowing the replenishing goods to enter the goods locker 2100 of the self-service pick-up cabinet. During this process, the push plate 1222 moves with the pallet 1221, that is, the relative position of the push plate 1222 with respect to both the pallet 1221 and the carried replenishing goods on the pallet 1221 is unchanged. Then, after the pallet 1221 is stopped to move, the push plate 1222 slides along the pallet 1221, so that the replenishing goods are pushed from one end of the pallet 1221 to the other end, thereby the replenishing goods are separated from the pallet 1221, and is placed within the goods locker 2100.

When the unloading is completed, the step S101 is performed again, the goods carrying unit 1220 is placed at the inlet of the self-service pick-up cabinet, and waits for a new replenishing goods to enter the inlet of the self-service pick-up cabinet. If the replenishing goods are not acquired temporarily, the goods carrying unit 1220 waits at the inlet of the self-service pick-up cabinet, until the replenishing goods are acquired, then steps S102 and S103 are performed in sequence, and finally returns to step S101, repeatedly.

According to an embodiment of the present disclosure, the method for replenishing goods realizes automatic replenishment of the self-service pick-up cabinet, thereby improving the efficiency of replenishing the self-service pick-up cabinet, and avoiding human input.

Figure 7:
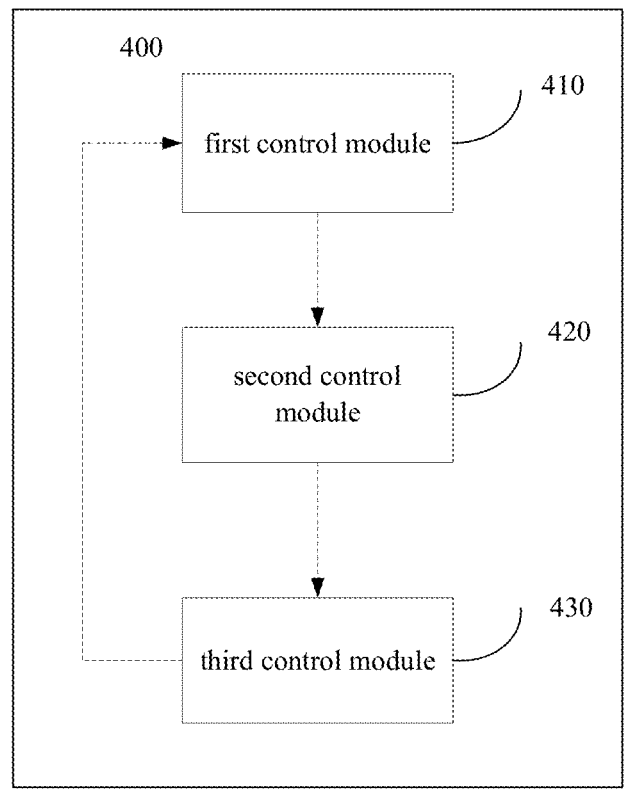
FIG. 7 is a block diagram showing a control system of a system for replenishing a self-service pick-up cabinet according to an exemplary embodiment of the present disclosure.

FIG. 7 schematically shows a block diagram of a control system of a system for replenishing a self-service pick-up cabinet according to an embodiment of the present disclosure. A control system 400 shown in FIG. 7 is a part of the control system 1100 of the system 1 for replenishing the self-service pick-up cabinet. The control system 400 shown in FIG. 7 includes: a first control module 410 configured to control the moving unit 1210 to transport the goods carrying unit 1220 to the inlet of the self-service pick-up cabinet; a second control module 420 configured to control the moving unit 1210 to transport the goods carrying unit 1220 to the rear side opening of the designated goods locker 2100 of the self-service pick-up cabinet, after acquiring the replenishing goods; and a third control module 430 configured to control the goods carrying unit 1220 to place the carried replenishing goods within the goods locker 2100. The three control modules 410, 420, 430 of the control system 400 perform corresponding control actions by detecting the position of the goods carrying unit 1220 and whether the goods carrying unit 1220 carries the replenishing goods. Therefore, when it is detected that the goods carrying unit 1220 is in an idle state and is not located at the inlet of the self-service pick-up cabinet, the first control module 410 controls the moving unit 1210 to transport the goods carrying unit 1220 to the inlet of the self-service pick-up cabinet; when it is detected that there are replenishing goods on the goods carrying unit 1220 which located at the inlet of the self-service pick-up cabinet, the second control module 420 controls the control moving unit 1210 to transport the goods carrying unit 1220 to the rear side opening of the designated goods locker 2100 of the self-service pick-up cabinet; when it is detected that the goods carrying unit 1220 carries the replenishing goods and arrives on the rear side opening of the designated goods locker 2100 of the self-service pick-up cabinet, the third control module 430 controls the goods carrying unit 1220 to place the carried replenishing goods within the goods locker 2100.

Figure 8:
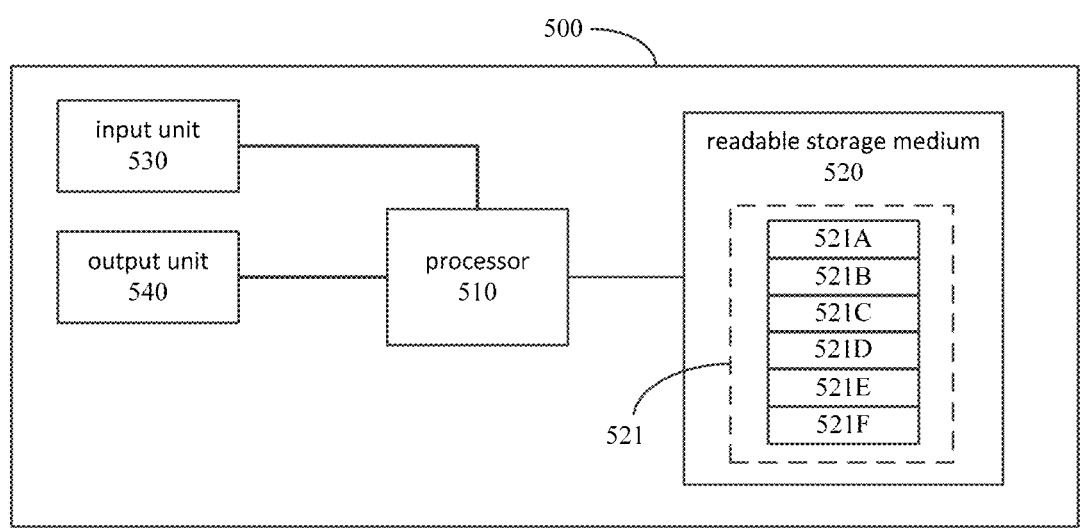
FIG. 8 is a block diagram showing a control system for replenishing a self-service pick-up cabinet according to an embodiment of the present disclosure.

FIG. 8 schematically shows a block diagram of a control system for replenishing a self-service pick-up cabinet according to an embodiment of the present disclosure. A control system 500 acts as the control system 1100 of the system 1 for replenishing the self-service pick-up cabinet. The control system 500 includes a processor 510, such as a general purpose microprocessor, an instruction set processor, a related chipset and/or a special purpose microprocessor (e.g., an application specific integrated circuit (ASIC)), or the like. The processor 510 may also include an onboard memory for caching purposes. The processor 510 may be a single processing unit or a plurality of processing units for performing different actions of the method flow, described with reference to FIG. 6, according to the embodiment of the present disclosure.

The control system 500 may also include at least one readable storage medium 520 in a form of a non-volatile or volatile memory, such as any medium that may contain, store, communicate, propagate, or transport instructions. For example, the readable storage medium may include, but is not limited to an electronic, magnetic, optical, electromagnetic, infrared, or semi-conductive system, apparatus, device, or propagation medium. Specific examples of the readable storage medium may include: a magnetic storage device such as a magnetic tape or a hard disk (HDD); an optical storage device such as a compact disk (CD-ROM); a memory such as a random access memory (RAM) or a flash memory; and/or a wired/wireless communication link.

The readable storage medium 520 includes a computer program 521 that includes codes/computer readable instructions that, when executed by the processor 510, cause the processor 510 to perform, for example, the method flow described above in connection with FIG. 6 and any variations thereof.

The computer program 521 may be configured to computer program codes, for example, including computer program modules. For example, in an exemplary embodiment, the codes in computer program 521 may include one or more program modules, including, for example, module 521A, module 521B, . . . module 521F. It should be noted that the division manner and the amount of modules are not fixed, and those skilled in the art may use suitable program modules or program module combinations according to actual situations. When these program module combinations are executed by the processor 510, the processor 510 may perform for example, the method flow described above in connection with FIG. 6 and any variations thereof.

According to an embodiment of the present disclosure, the control system 500 may also include an input unit 530 for receiving signals from other entities, and an output unit 540 for providing signals to other entities. The input unit 530 and the output unit 540 may be arranged as a single entity or as separate entities. The input unit 530 and the output unit 540 may be used under the control of the processor 510 to control the interaction between the control system 500 and the system 1 for replenishing the self-service pick-up cabinet.

Figure 9:
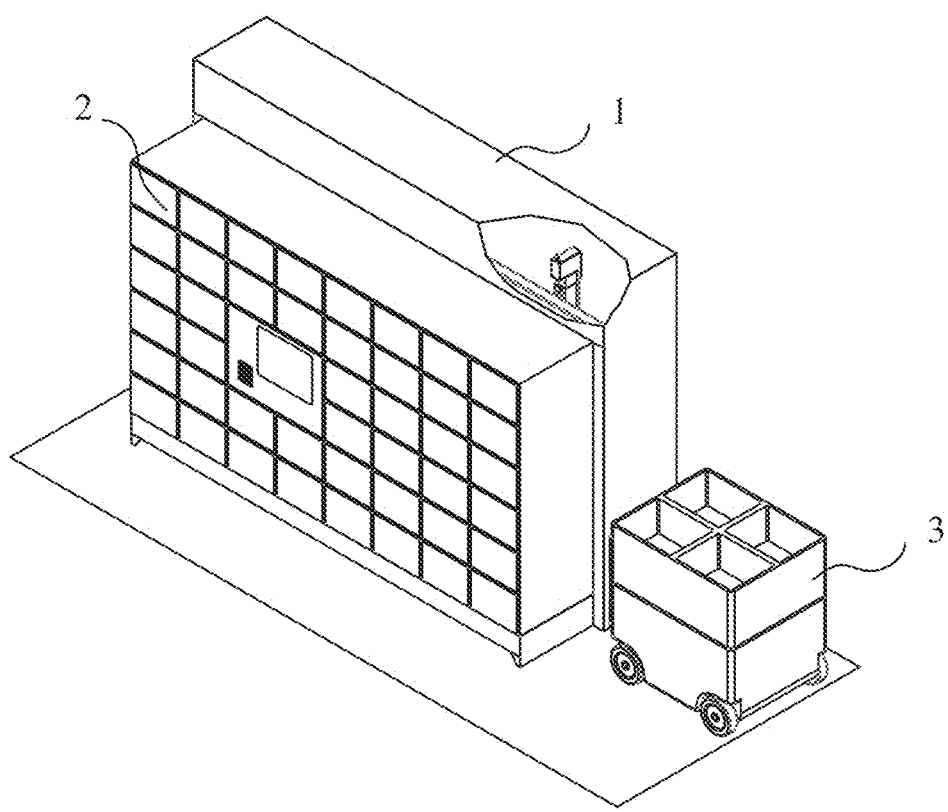
FIG. 9 is a schematic assembly view of a self-service pick-up cabinet system according to an embodiment of the present disclosure.

FIG. 9 schematically shows an assembly view of a self-service pick-up cabinet system according to an embodiment of the present disclosure, the self-service pick-up cabinet system includes a self-service pick-up cabinet 2, an unmanned delivery vehicle 3, and a system 1 for replenishing the self-service pick-up cabinet. The self-service pick-up cabinet 2 includes a plurality of goods lockers 2100, and the unmanned delivery vehicle 3 is used for transporting and unloading the replenishing goods to the inlet of the self-service pick-up cabinet.

In an embodiment, the unmanned delivery vehicle 3 includes a positioning device and an unloading device; the positioning device is configured to position an outlet of the unmanned delivery vehicle 3 above the feeding passage 1400; and the unloading device is configured to unload the replenishing goods into the feeding passage 1400 via the outlet of the unmanned delivery vehicle 3.

According to an embodiment of the present disclosure, the unmanned delivery vehicle 3 realizes the accurate transportation and positioning of the replenishing goods by the positioning device, and then the unloading device unloads the replenishing goods one by one into the feeding passage 1400, so that the replenishing goods passes through the inlet of the self-service pick-up cabinet and falls on the object carrying device 1220 of the system 1 for replenishing the self-service pick-up cabinet, realizing an automated process of transporting, unloading and loading the replenishing goods to the corresponding goods locker 2100 of self-service pick-up cabinet.

Figure 10:
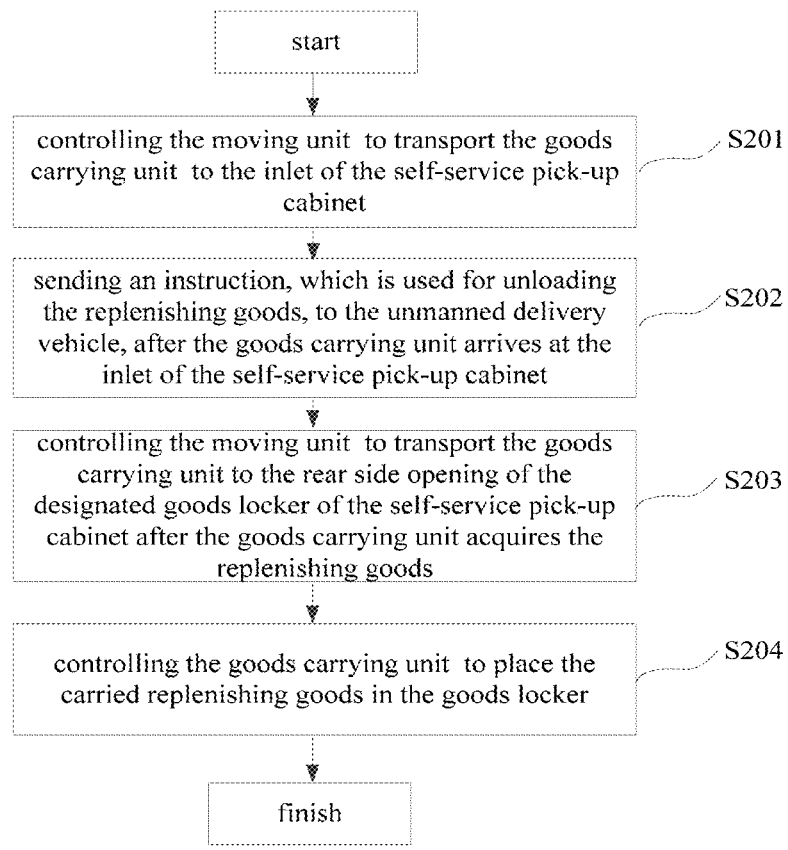
FIG. 10 is a flow chart showing a method of replenishing goods by using a self-service pick-up cabinet system according to an embodiment of the present disclosure.

FIG. 10 schematically shows a flow chart of a method of replenishing goods by using a self-service pick-up cabinet system according to an embodiment of the present disclosure, the method including:

step S201: controlling the moving unit 1210 to transport the goods carrying unit 1220 to the inlet of the self-service pick-up cabinet;

step S202: sending an instruction, which is used for unloading the replenishing goods, to the unmanned delivery vehicle 3, after the goods carrying unit 1220 arrives at the inlet of the self-service pick-up cabinet;

step S203: controlling the moving unit 1210 to transport the goods carrying unit to the rear side opening of the designated goods locker 2100 of the self-service pick-up cabinet after the goods carrying unit 1220 acquires the replenishing goods; and step S204: controlling the goods carrying unit 1220 to place the carried replenishing goods in the goods locker 2100.

According an embodiment of the present disclosure, it may be, for example, that the control system 1100 of the system 1 for replenishing the self-service pick-up cabinet controls the actions of the moving unit 1210 and the goods carrying unit 1220 while transmitting the instruction, which is used for unloading the replenishing goods, to the unmanned delivery vehicle 3 in the step S202, the instruction informing a control system of the unmanned delivery vehicle 3 that the goods carrying unit 1220 is already in position; alternatively, it may be for example, that the control system 1100 of the system 1 for replenishing the self-service pick-up cabinet simultaneously controls the actions of the moving unit 1210, the goods carrying unit 1220 and the unmanned delivery vehicle 3.

Figure 11:
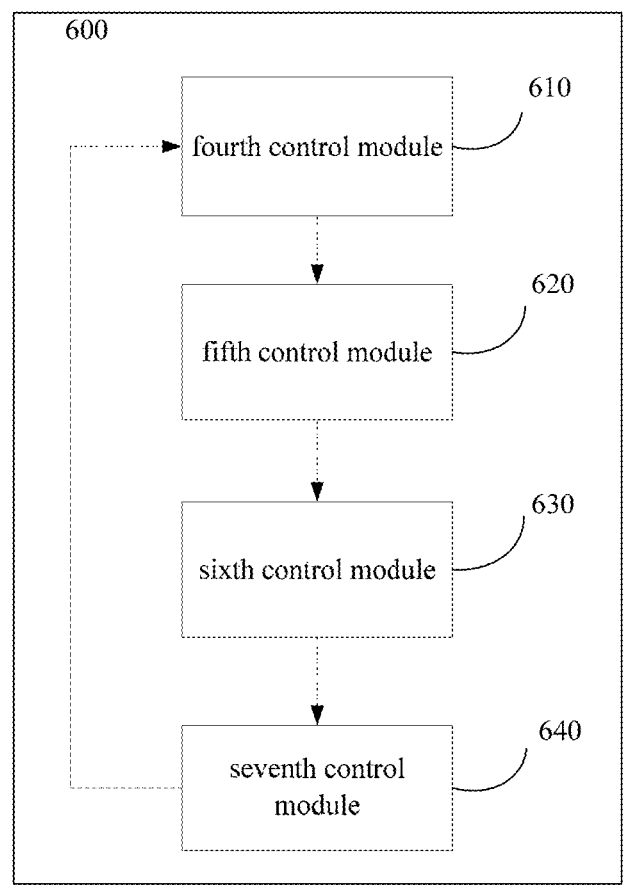
FIG. 11 is a block diagram showing an apparatus for replenishing goods by using the self-service pick-up cabinet system according to an embodiment of the present disclosure.

FIG. 11 schematically shows a block diagram of an apparatus for replenishing goods by using a self-service pick-up cabinet system according to an embodiment of the present disclosure. As shown in FIG. 11, the apparatus 600 includes: a fourth control module 610 configured to control the moving unit 1210 to transport the goods carrying unit 1220 to the inlet of the self-service pick-up cabinet; a fifth control module 620 configured to send an instruction, which is used for unloading the replenishing goods, to the unmanned delivery vehicle 3 after the goods carrying unit 1220 arrives at the inlet of the self-service pick-up cabinet; a sixth control module 630 configured to control the moving unit 1210 to transport the goods carrying unit 1220 to the rear side opening of the designated goods locker 2100 of the self-service pick-up cabinet, after the goods carrying unit 1220 acquires the replenishing goods; and a seventh control module 640 configured to control the goods carrying unit 1220 to place the carried replenishing goods in the goods locker 2100. According to an embodiment of the present disclosure, the fourth control module 610, the sixth control module 630, and the seventh control module 640 of the apparatus 600 may be parts of the control system 1100 of the system 1 for replenishing the self-service pick-up cabinet.

According to an embodiment of the present disclosure, the four control modules 610, 620, 630, 640 of the apparatus 600 perform respective control actions by detecting the position of the goods carrying unit 1220 and whether the goods carrying unit 1220 carries the replenishing goods. Therefore, when it is detected that the goods carrying unit 1220 is in an idle state and is not located at the inlet of the self-service pick-up cabinet, the fourth control module 610 controls the moving unit 1210 to transport the goods carrying unit 1220 to the inlet of the self-service pick-up cabinet; when it is detected that the goods carrying unit 1220 is in the idle state and is located at the inlet of the self-service pick-up cabinet, the fifth control module 620 sends an instruction, which is used for unloading the replenishing goods, to the unmanned delivery vehicle; when it is detected that there are replenishing goods on the goods carrying unit 1220 which is located at the inlet of the self-service pick-up cabinet, the sixth control module 630 controls the moving unit 1210 to transport the goods carrying unit to the rear side opening of the designated goods locker 2100 of the self-service pick-up cabinet; when it is detected that the goods carrying unit 1220 carries the replenishing goods and arrives at the designated goods locker 2100, the seventh control module 640 controls the goods carrying unit 1220 to place the carried replenishing goods in the goods locker 2100.

Figure 12:
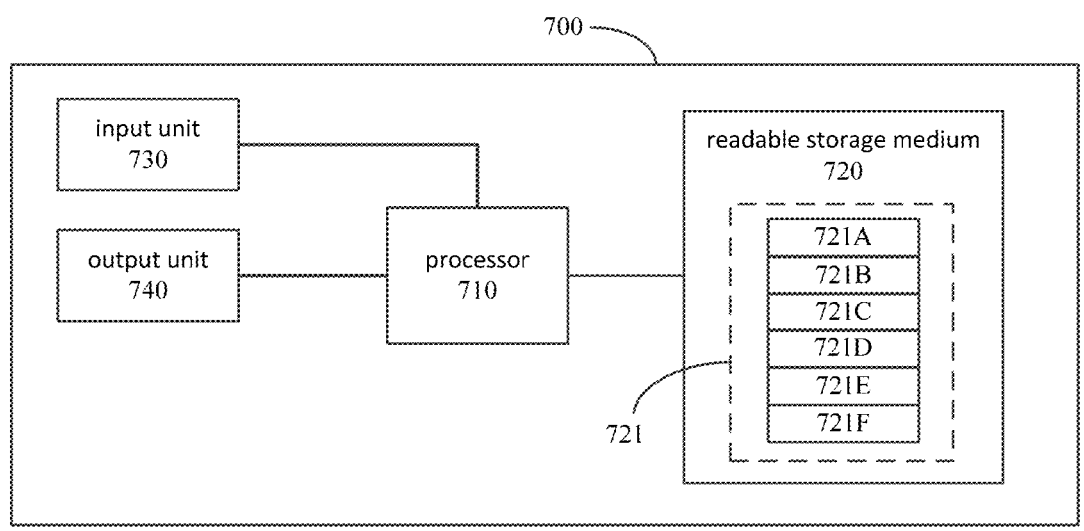
FIG. 12 is a block diagram showing a control system for replenishing a self-service pick-up cabinet according to another embodiment of the present disclosure.

FIG. 12 schematically shows a block diagram of a control system for replenishing a self-service pick-up cabinet according to another embodiment of the present disclosure. A control system 700 includes a processor 710, such as a general purpose microprocessor, an instruction set processor, a related chipset and/or a special purpose microprocessor (e.g., an application specific integrated circuit (ASIC)), or the like. The processor 710 may also include an onboard memory for caching purposes. The processor 710 may be a single processing unit or a plurality of processing units for performing different actions of the method flow, described with reference to FIG. 7, according to the embodiment of the present disclosure.

The control system 700 may also include at least one readable storage medium 720 in a form of a non-volatile or volatile memory, such as any medium that may contain, store, communicate, propagate or transport the instructions. For example, the readable storage medium may include, but is not limited to, an electronic, magnetic, optical, electromagnetic, infrared, or semi-conductive system, apparatus, device, or propagation medium. Specific examples of the readable storage medium may include: a magnetic storage device such as a magnetic tape or a hard disk (HDD); an optical storage device such as a compact disk (CD-ROM); a memory such as a random access memory (RAM) or a flash memory; and/or a wired/wireless communication link.

The readable storage medium 720 includes a computer program 721 that includes codes/computer readable instructions that, when executed by the processor 710, cause the processor 710 to perform, for example, the method flow described above in connection with FIG. 10, and any variations thereof.

The computer program 721 can be configured to have computer program codes, for example, including computer program modules. For example, in an exemplary embodiment, the codes in computer program 721 may include one or more program modules, including, for example, module 721A, module 721B, . . . module 721F. It should be noted that the division manner and the amount of modules are not fixed, and those skilled in the art may use suitable program modules or program module combinations according to actual situations. When these program module combinations are executed by the processor 710, the processor 710 may perform for example, the method flow described above in connection with FIG. 10 and any variations thereof.

According to an embodiment of the present disclosure, the control system 700 may also include an input unit 730 for receiving signals from other entities, and an output unit 740 for providing signals to other entities. The input unit 730 and the output unit 740 may be arranged as a single entity or as separate entities. The input unit 730 and the output unit 740 may be used under the control of the processor 710 to control the interaction among the control system 700, the system 1 for replenishing the self-service pick-up cabinet, and the unmanned delivery vehicle 3.

The specific embodiments described above further explain the objectives, technical schemes and beneficial effects of the present disclosure. It should be understood that the foregoing is only specific embodiments of the present disclosure and is not intended to limit the disclosure, Any modifications, equivalent substitutions, improvements, or the like, made within the spirit and principles of the present disclosure are intended to be included within the scope of the present disclosure.

What is claimed is:

1. A system for replenishing a self-service pick-up cabinet, the self-service pick-up cabinet comprising a plurality of goods lockers, the system for replenishing the self-service pick-up cabinets comprising a goods transport device and a control system, wherein:

the control system controls an action of the goods transport device;

the goods transport device is located on a rear side of the self-service pick-up cabinet, and comprises: a moving unit and a goods carrying unit, wherein the moving unit is capable of transporting the goods carrying unit to a rear side opening of any one of the plurality of goods lockers of the self-service pick-up cabinet, the moving unit transports the goods carrying unit to an inlet of the self-service pick-up cabinet to acquire replenishing goods at the inlet of the self-service pick-up cabinet, and transport the goods carrying unit carrying the replenishing goods to the rear side opening of one, designated by the control system, of the plurality of goods lockers of the self-service pick-up cabinet, under the control of the control system; the goods carrying unit places the carried replenishing goods into the one of the plurality of goods lockers under the control of the control system, wherein the goods transport device is a cartesian robot, and the moving unit comprises a first shaft and a second shaft;

wherein the first shaft and the second shaft intersect perpendicularly, and a plane formed by the first shaft and the second shaft is parallel to a plane in which the rear side opening of any one of the plurality of goods lockers of the self-service pick-up cabinet is located;

wherein the goods carrying unit is a horizontal tray comprising a pallet and a push plate;

wherein the pallet is slidable in a third direction perpendicular to the plane formed by the first shaft and the second shaft to extend into the one of the plurality of goods lockers of the self-service pick-up cabinet when the replenishing goods are transported into the one of the plurality of goods lockers of the self-service pick-up cabinet;

wherein the push plate is mounted on the pallet and located at one end of the pallet, and the push plate is movable together with the horizontal sliding of the pallet and wherein the push plate is slidable from the one end of the pallet to the other end to push the carried replenishing goods on the pallet into the one of the plurality of goods lockers of the self-service pick-up cabinet.

2. The system for replenishing the self-service pick-up cabinet according to claim 1, wherein the first shaft is fixed in a first direction, the first direction being a direction of a horizontal plane where the self-service pick-up cabinet is located or a direction perpendicular to the horizontal plane where the self-service pick-up cabinet is located;

the second shaft is slidable along the first shaft;

the goods carrying unit is located on the second shaft and moves with the sliding of the second shaft, while being slidable along the second shaft.

3. The system for replenishing the self-service pick-up cabinet according to claim 2, wherein the first shaft comprises a first slide table slidable along the first shaft, an end of the second shaft is fixed to the first slide table so that the second shaft is slidable along the first shaft; the second shaft comprises a second slide table slidable along the second shaft, and the goods carrying unit is fixed to the second slide table so that the goods carrying unit is slidable along the second shaft.

4. The system for replenishing the self-service pick-up cabinet according to claim 1, further comprising:

a packaging cabinet configured to package the goods transport device on the rear side of the self-service pick-up cabinet.

5. The system for replenishing the self-service pick-up cabinet according to claim 4, wherein the inlet of the self-service pick-up cabinet is disposed on at least a side of the packaging cabinet; and an outer side of the packaging cabinet is provided with a feeding passage for the replenishing goods to enter the inlet of the self-service pick-up cabinet; and the goods carrying unit acquires the replenishing goods through the feeding passage at the inlet of the self-service pick-up cabinet.

6. The system for replenishing the self-service pick-up cabinet according to claim 1, wherein the control system comprises:

a first control module configured to control the moving unit to transport the good carrying unit to the inlet of the self-service pick-up cabinet;

a second control module configured to control the moving unit to transport the goods carrying unit to the rear side opening of the designated one of the plurality of goods lockers of the self-service pick up cabinet after acquiring the replenishing goods; and a third control module configured to control the goods carrying unit to place the carried replenishing goods into the one of the plurality of goods lockers of the self-service pick-up cabinet.

7. A method of replenishing goods by using the system according to claim 1, comprising:

controlling the moving unit to transport the goods carrying unit to the inlet of the self-service pick-up cabinet;

controlling the moving unit to transport the goods carrying unit to the rear side opening of the designated one of the plurality of goods lockers of the self-service pick-up cabinet after acquiring the replenishing goods; and controlling the goods carrying unit to place the carried replenishing goods into the one of the plurality of goods lockers.

8. A control system for replenishing a self-service pick-up cabinet, comprising:
one or more memories in which executable instructions are stored; and
one or more processors configured to execute the executable instructions to implement the method according to claim 7.

9. A non-transitory machine-readable storage medium storing executable instructions, wherein the executable instructions, when executed by a processor, cause the processor to implement the method according to claim 7.

10. A self-service pick-up cabinet system, comprising:
a self-service pick-up cabinet;
an unmanned delivery vehicle; and
the system for replenishing the self-service pick-up cabinet according to claim 1;
wherein the self-service pick-up cabinet comprises the plurality of goods lockers;
the unmanned delivery vehicle is configured to transport and unload the replenishing goods to the inlet of the self-service pick-up cabinet.

11. The self-service pick-up cabinet system according to claim 10, wherein the unmanned delivery vehicle comprises a positioning device and an unloading device,
the positioning device is configured to position an outlet of the unmanned delivery vehicle above the feeding passage of the self-service pick-up cabinet;
the unloading device is configured to unload the replenishing goods into a feeding passage of the self-service pick-up cabinet via the outlet of the unmanned delivery vehicle.

12. A method of replenishing goods by using the self-service pick-up cabinet system according to claim 10, comprising:
controlling the moving unit to transport the goods carrying unit to the inlet of the self-service pick-up cabinet;
sending to the unmanned delivery vehicle an instruction for unloading the replenishing goods, after the goods carrying unit arrives at the inlet of the self-service pick-up cabinet;
controlling the moving unit to transport the goods carrying unit to the rear side opening of the designated one of the plurality of goods lockers of the self-service pick-up cabinet after the goods carrying unit acquires the replenishing goods; and
controlling the goods carrying unit to place the carried replenishing goods into the one of the plurality of goods lockers of the self-service pick-up cabinet.

13. An apparatus for replenishing goods by using the self-service pick-up cabinet system according to claim 10, comprising:
a fourth control module configured to control the moving unit to transport the goods carrying unit to the inlet of the self-service pick-up cabinet;
a fifth control module configured to send to the unmanned delivery vehicle an instruction for unloading the replenishing goods, after the goods carrying unit arrives at the inlet of the self-service pick-up cabinet; and
a sixth control module configured to control the moving unit to transport the goods carrying unit to the rear side opening of the designated one of the plurality of goods lockers of the self-service pick-up cabinet after the goods carrying unit acquires the replenishing goods; and
a seventh control module configured to control the goods carrying unit to place the carried replenishing goods into the one of the plurality of goods lockers.

14. A control system for replenishing a self-service pick-up cabinet, comprising:
one or more memories in which executable instructions are stored; and
one or more processors configured to execute the executable instructions to implement the method according to claim 12.

15. A non-transitory machine-readable storage medium storing executable instructions, wherein the executable instructions, when executed by a processor, cause the processor to implement the method according to claim 12.

* * * * *